Patented Apr. 12, 1949

2,467,231

UNITED STATES PATENT OFFICE 2,467,231

IODOSO DIACYLATE CATALYSIS OF ADDITION POLYMERIZATION PROCESSES

Lawrence M. Richards, Wilmington, Del., assignor to E. I. du Pont de Nemours & Company, Wilmington, Del., a corporation of Delaware No Drawing. Application August 12, 1946, Serial No. 690,087

12 Claims. (Cl. 260—83)

This invention relates to the addition polymerization of unsaturated compounds, and more particularly to a new class of catalyst for this type of polymerization.

The addition polymerization of unsaturated compounds produces high molecular weight polymers having properties which make them of considerable value in many commercial applications. Such addition polymerizations are generally accomplished by the use of a catalyst to activate the unsaturated monomer and initiate a chain reaction between the activated molecules and unactivated molecules. Heretofore various types of catalysts, such as metal halides, metalloid halides, and peroxides, have been used to effect such polymerizations. While these known catalysts are effective with some unsaturated monomers under certain reaction conditions, they are not so effective with other unsaturated monomers or under more desirable conditions.

It is an object of this invention to provide a new process for preparing polymers by addition polymerizations. A further object is to provide a new type of catalyst for addition polymerizations. Other objects will appear hereinafter.

These objects are accomplished by the following invention of a process which comprises effecting addition polymerization in the presence of an iodoso diacylate that is, a trivalent iodine compound having two (acyl-O)- radicals joined to the iodine atom. The particular portion of the iodoso diacylate molecule which is responsible for its activity in catalyzing addition polymerization is the group —[I(OAcyl)$_2$]. It is immaterial what radical is combined with this group through the third bond of the trivalent iodine atom. The acyl group in these iodoso diacylates can be derived from any aromatic or aliphatic carboxylic acid. A preferred class of iodoso diacylates is that in which an aromatic substituent group is attached through the third valence of the iodine atom. In this class the aromatic radical can be an unsubstituted aryl radical or one substituted with alkyl radicals, such as methyl or ethyl, or with halogen atoms or sulfonic acid groups.

The process of this invention is applicable generally to unsaturated compounds containing at least one ethylenic linkage and which are capable of undergoing addition polymerization. The process is also applicable to the copolymerization of two or more of such unsaturated compounds, and to the copolymerization of one of such unsaturated compounds with olefinic derivatives which are not by themselves polymerizable but which do enter into copolymerization reactions with other polymerizable olefinic derivatives.

The process of this invention can be carried out by polymerizing the monomeric unsaturated compound or compounds in the presence of an iodoso diacylate. The polymerization can be carried out in the presence or absence of an inert solvent or diluent. The polymerization can also be carried out by emulsion polymerization techniques. A preferred method of carrying out the process of this invention is by contacting the monomeric unsaturated compound which is to be polymerized with a catalytic amount of an iodoso diacylate, for example iodosobenzene dipropionate, for a period of time sufficient to effect the desired degree of polymerization.

The proportions of catalyst which give satisfactory results range from 0.1% to 10% of the weight of the unsaturated monomer or monomers. Amounts ranging from 0.5% to 5% preferably are employed to obtain optimum results, the exact amount depending on the particular catalyst, the particular monomer being polymerized and the degree of polymerization desired. The polymerization can be carried out over a wide range of temperatures and pressures. Polymerization takes place at temperatures ranging from 0° to 100° C., the reaction proceeding more rapidly at the higher temperature. Polymerization occurs at pressures ranging from atmospheric to as high as 1000 atmospheres or more, the particular pressure selected depending on the particular monomer being polymerized.

The iodoso diacylates used as catalysts in the process of this invention can be prepared by known methods. For example, iodosobenzene dipropionate can be prepared by the method described by Willgerodt, J. prakt. Chem. 33, 154–160 and Ber. 25, 3494 (1892).

This invention is further illustrated by the following examples in which the proportions of ingredients are expressed in parts by weight, unless otherwise specified.

*Example I*

A stainless steel-lined reaction vessel capable of withstanding high pressures, is swept out with oxygen-free nitrogen and charged with 125 parts of freshly distilled, oxygen-free vinyl acetate and 0.2 part of iodosobenzene dipropionate. The charge occupies about 30% of the free space in the reactor. The reactor is closed, the nitrogen removed by evacuation, the temperature of the reactor and its contents raised to 65° C. and ethylene introduced until an internal pressure of 900 atms. is obtained. The reaction mixture is maintained at 65° with continuous agitation for a period of 6.5 hours. During this time, the pressure is maintained at 750-950 atms. by the periodic addition of more ethylene. At the end of this time, the reaction vessel is cooled, vented to remove excess ethylene and opened. There is separated from the reaction mixture 5 parts of solid polymer.

This product, an interpolymer of ethylene and vinyl acetate, is dissolved in a refluxing mixture of 80 parts of benzene and 40 parts of methanol. To this solution is added slowly, 30 parts of methanol containing 2 parts of potassium hydroxide. After refluxing for two hours more, the hot mixture is poured into 1000 parts of cold water with stirring. The polymer is broken up into small pieces and washed with water until free from alkali. The resulting polymer, which is hydrolyzed ethylene/vinyl acetate, is insoluble in hot water and forms, at 140° C. under a pressure of 2000 lbs./sq. in., a film having a tensile strength of 2,730 lbs./sq. in., 175% elongation, and a bending modulus of $0.096 \times 10^{-6}$ lbs./sq. in.

*Example II*

A reaction vessel of the type used in Example I is charged with 100 parts of cyclohexane and 0.5 part iodosobenzene diproprionate. After sweeping out the free space with oxygen-free nitrogen, the reaction vessel is evacuated, and ethylene introduced until the internal pressure is 900 atms. The reaction vessel is agitated continuously and heated to 70° C. for a period of 9 hours, with the internal pressure maintained at 850-950 atms. by the intermittent addition of ethylene. The reaction vessel is then cooled, vented to remove excess ethylene, opened and the reaction mixture removed. There is isolated from the reaction mixture, one part of a solid brittle polymer of ethylene.

*Example III*

A reaction vessel is flushed with oxygen-free nitrogen, cooled to 0° C., and charged with 5 parts of acrylonitrile and 0.1 part of iodosobenzene dipropionate. The reaction vessel is then evacuated, closed and allowed to stand for 1 week at 0° to 5° C. At the end of this time, the reaction vessel is opened and the reaction mixture removed. There is obtained 3.5 parts of a solid polymer of acrylonitrile.

*Example IV*

A reaction vessel capable of withstanding moderate pressure is charged with 20 parts of acrylonitrile, 80 parts of cyclohexane, and 0.1 part of iodosobenzene diproprionate. The free space in the reactor is flushed with nitrogen, and the vessel is then closed and heated for 4 hours at 40° C. in a water bath. After cooling to room temperature, the reaction vessel is opened, the reaction mixture removed and the solid product collected on a filter. A yield of 8.5 parts of acrylonitrile polymer is obtained.

When benzoyl peroxide is substituted for the iodosobenzene diproprionate, no polymer is obtained under the same reaction conditions.

*Example V*

Twenty (20) parts of styrene and 0.1 part of iodosobenzene diproprionate are placed in a glass reaction vessel. After 5 days at ordinary temperature, the reaction mixture is viscous, thus indicating polymerization has taken place.

In the absence of a polymerization catalyst, monomeric styrene does not show an appreciable increase in viscosity under these conditions.

*Example VI*

A reaction vessel of the type used in Example I is flushed with nitrogen, charged with 0.5 part of iodosobenzene diproprionate and 80 parts of benzene, evacuated, and ethylene introduced until an internal pressure of 600 atms. is obtained. The reaction vessel is agitated and heated at 80° C. for 15 hours. During this time, the pressure is maintained at 900-950 atms. by the occasional addition of more ethylene. The reaction vessel is then cooled, vented to remove unreacted ethylene, and opened. There is separated from the reaction mixture, 1.2 parts of a polymer of ethylene.

Any iodoso diacrylate, that is, any compound having the group —[I(OAcyl)$_2$], can be employed as the catalyst or initiator in the addition polymerization process of this invention. Specific examples of iodoso diacylates include iodosobenzene diacetate, iodosobenzene dipropionate, iodosobenzene dibenzoate, iodoso-m-xylene diacetate, iodoso-p-chlorobenzene diacetate, iodosotriacetate, and the like.

Among the particular classes of compounds which can be polymerized by the process of this invention are monoolefinic hydrocarbons, such as ethylene and styrene, and mono- and disubstituted ethylenes in which the substituent groups are electron-attracting groups, such as carbonyl-containing residues and cyano residues, for example, vinyl acetate and acrylonitrile.

The products prepared by the process of this invention are polymers of varying molecular weight, and range from viscous liquids to solids. They are of particular utility in the formation of films, fibers, coating compositions, and the like.

As many apparently widely different embodiments of this invention may be made without departing from the spirit and scope thereof, it is to be understood that I do not limit myself to the specific embodiments thereof except as defined in the appended claims.

I claim:

1. A polymerization process which comprises polymerizing at a temperature of 0° to 100° C. in the presence of an iodoso diacylate catalyst an ethylenically unsaturated polymerizable compound containing only one ethylenic linkage and which compound is capable of undergoing addition polymerization, said iodoso diacylate catalyst being present in amount of 0.1% to 10% by weight of said polymerizable compound.

2. A polymerization process which comprises polymerizing at a temperature of 0° to 100° C. in the presence of an iodoso diacylate catalyst having an aromatic substituent group attached through the third valence of the iodine atom an ethylenically unsaturated polymerizable hydrocarbon containing only one ethylenic linkage and which compound is capable of undergoing addition polymerization, said iodoso diacylate catalyst being present in amount of 0.1% to 10% by weight of said polymerizable hydrocarbon.

3. A polymerization process which comprises polymerizing at a temperature of 0° to 100° C. in the presence of iodosobenzene dipropionate catalyst an ethylenically unsaturated polymerizable compound containing only one ethylenic linkage and which compound is capable of undergoing addition polymerization, said iodosobenzene dipropionate catalyst being present in amount of 0.1% to 10% by weight of said polymerizable compound.

4. A polymerization process which comprises polymerizing ethylene at a temperature of 0° to 100° C. in the presence of 0.1% to 10% based on the weight of said ethylene of an iodoso diacylate catalyst.

5. A polymerization process which comprises polymerizing ethylene at a temperature of 0° to 100° C. in the presence of an iodoso diacylate catalyst having an aromatic substituent group attached through the third valence of the iodine atom.

6. A polymerization process which comprises polymerizing ethylene at a temperature of 0° to 100° C. in the presence of 0.1% to 10% based on the weight of said ethylene of iodosobenzene dipropionate catalyst.

7. A polymerization process which comprises polymerizing styrene at a temperature of 0° to 100° C. in the presence of 0.1% to 10% based on the weight of said styrene of an iodoso diacylate catalyst.

8. A polymerization process which comprises polymerizing acrylonitrile at a temperature of 0° to 100° C. in the presence of 0.1% to 10% based on the weight of said acrylonitrile of an iodoso diacylate catalyst.

9. A polymerization process which comprises copolymerizing at a temperature of 0° to 100° C. in the presence of an iodoso diacylate catalyst an ethylenically unsaturated polymerizable compound containing only one ethylenic linkage and which compound is capable of undergoing addition polymerization and ethylene, said iodoso diacylate catalyst being present in amount of 0.1% to 10% based on the total weight of said polymerizable compound and ethylene.

10. A polymerization process which comprises copolymerizing vinyl acetate and ethylene at a temperature of 0° to 100° C. in the presence of 0.1% to 10% based on the total weight of said vinyl acetate and ethylene of an iodoso diacylate catalyst having an aromatic substituent group attached through the third valence of the iodine atom.

11. A polymerization process which comprises polymerizing at a temperature of 0° to 100° C. an ethylenically unsaturated polymerizable compound containing only one ethylenic linkage and which compound is capable of undergoing addition polymerization in contact with 0.5% to 5% of an iodoso diacylate catalyst based on the weight of said unsaturated compound.

12. A polymerization process which comprises polymerizing at a temperature between 0° and 100° C. under a pressure from 1 to 1000 atms. an ethylenically unsaturated polymerizable hydrocarbon containing only one ethylenic linkage and which compound is capable of undergoing addition polymerization in the presence of 0.1% to 10% of an iodoso diacylate catalyst based on the weight of said unsaturated compound.

LAWRENCE M. RICHARDS.

No references cited.